(12) United States Patent
Hanks et al.

(10) Patent No.: US 7,446,064 B2
(45) Date of Patent: Nov. 4, 2008

(54) IMPACT RESISTANT BUILDING PANELS

(75) Inventors: Jeffrey Alan Hanks, Midlothian, VA (US); Jeffrey Allen Chambers, Hockessin, DE (US); Sassan Hojabr, Kingston (CA); Stephen Robert Tanny, Newark, DE (US); Samuel W. Chastain, Smyrna, GA (US); Karl-Heinz J. Reilmann, Eastman, GA (US)

(73) Assignees: Alcoa Inc., Pittsburgh, PA (US); E.I. duPont de Nemours and Company, Wilmington, DE (US)

( * ) Notice: Subject to any disclaimer, the term of this patent is extended or adjusted under 35 U.S.C. 154(b) by 435 days.

(21) Appl. No.: 11/365,122

(22) Filed: Mar. 1, 2006

(65) Prior Publication Data

US 2007/0207301 A1  Sep. 6, 2007

(51) Int. Cl.
*B32B 15/14* (2006.01)

(52) U.S. Cl. .............. 442/378; 442/398; 442/371; 442/370; 428/214; 428/215; 428/212; 428/213

(58) Field of Classification Search .............. 442/378, 442/398, 371, 370, 373; 428/113, 213, 215, 428/218, 214, 461, 212
See application file for complete search history.

(56) References Cited

U.S. PATENT DOCUMENTS

| | | | |
|---|---|---|---|
| 4,029,838 A | 6/1977 | Chamis et al. | |
| 4,181,768 A | 1/1980 | Severin | |
| 4,500,589 A | 2/1985 | Schijve et al. | |
| 4,678,702 A | 7/1987 | Lancaster et al. | |
| 5,092,952 A | 3/1992 | Minnick et al. | |
| 5,160,771 A * | 11/1992 | Lambing et al. | 428/57 |
| 5,227,216 A * | 7/1993 | Pettit | 428/113 |
| 5,246,523 A | 9/1993 | Minnick et al. | |
| 5,248,367 A | 9/1993 | Minnick et al. | |
| 5,248,369 A | 9/1993 | Minnick et al. | |
| 5,480,706 A * | 1/1996 | Li et al. | 428/113 |
| 5,578,384 A * | 11/1996 | Kingston | 428/608 |
| 6,194,081 B1 * | 2/2001 | Kingston | 428/608 |
| 6,586,110 B1 | 7/2003 | Obeshaw | |
| 6,797,364 B2 * | 9/2004 | Okada et al. | 428/174 |
| 6,855,432 B1 * | 2/2005 | Hojabr et al. | 428/461 |

* cited by examiner

*Primary Examiner*—N Edwards
(74) *Attorney, Agent, or Firm*—Daniel C. Abeles; Eckert Seamans Cherin & Mellott, LLC

(57) ABSTRACT

A composite building panel that includes a fabric reinforcing sheet between one of the metal skins and the core of the panel. The fabric reinforcing sheet, which is preferably made from aramid fibers improves the impact resistance and penetration resistance of the building panel without substantially increasing weight and without adding fuel content to the panel system.

15 Claims, 2 Drawing Sheets

IMPACT RESISTANT BUILDING PANELS

BACKGROUND OF THE INVENTION

1. Field of the Invention

The present invention relates to building panels. More specifically, the invention provides an impact resistant exterior building panel having a fabric reinforcing layer and a polymer core between a pair of metal skins.

2. Description of the Related Art

The need for reinforced building panels in regions that are subject to hurricanes and other storms capable of significantly damaging buildings is increasingly recognized. In many areas of the United States, building codes are now requiring commercial and residential structures to be designed to resist the wind loads and debris impact loads generated by these severe storms. Current practice for many of these areas is to sheath the exterior surface of the structure with minimum ⅝ inch thick plywood, before application of the final building exterior covering. For example, wall panels in Florida that use composite building panels having metal skins and polymer cores are typically installed over ⅝ inch (1.588 cm) thick 5-ply plywood to meet the debris impact load requirements specified by the Florida building code. Although the plywood provides excellent impact resistance, its installation increases costs and build time for the structure. The wall sections also are heavy, and the wood adds fuel content to the system, decreasing the overall fire resistance of the structure. There exists a need to improve the impact resistance of these metal composite material building panels, to meet the impact requirements for severe storm resistance, without the use of the plywood sheathing.

Methods to improve the impact resistance for metal composite panels for uses other than building panels are described in other patents. For example, U.S. Pat. No. 5,092,952 issued to M. G. Minnick et al. on Mar. 3, 1992, discloses a composite panel having an aluminum skin and a glass fiber reinforced polypropylene core. The skin is laminated to the core using an adhesive having an ethylene/acrylic acid copolymer combined with a linear low density polyethylene or a thermoplastic styrene/diene block copolymer. Similar inventions are described in U.S. Pat. No. 5,246,523, issued to M. G. Minnick et al. on Sep. 21, 1993, U.S. Pat. No. 5,248,367 issued to M. G. Minnick et al. on Sep. 21, 1993 and U.S. Pat. No. 5,248,369, issued to M. G. Minnick et al. on Sep. 28, 1993. Reinforcement of these panels is provided by the continuous dispersion of the reinforcing fibers within the polymer core as it is being produced. This type of reinforcement would not provide the same impact resistance as a panel having a reinforcing layer directly adjacent to the outer skin. Furthermore, production of these panels is more cumbersome.

Similar approaches to continuous dispersion of fibers into a polymer core of a metal composite are described in U.S. Pat. No. 6,586,110, issued to D. F. Obershaw on Jul. 1, 2003. This patent discloses composite structural members having exterior and interior skins that may be made from metallic sheet, with a core having a ribbed structure and a resinous or polymeric filler therein. In some embodiments, sheet molding compounds are used for the inner or outer portions, and may be reinforced with KEVLAR® fibers. The rib structure within the core precludes the use of manufacturing procedures that could be used without such a ribbed core.

Approaches to improving the adhesion of the metal skins to the polymer cores of metal composite material are described in other patents. One example is U.S. Pat. No. 6,855,432, issued to S. Hobajar, et al. on Feb. 15, 2005, disclosing an adhesive composition that is particularly useful for joining aluminum skins to polymer cores to form composite panels. No method of reinforcing a panel is disclosed.

Approaches to bonding parallel aramid fibers inside aluminum sheets with various adhesive systems are also described in the art. These materials were designed to provide high performance aerospace materials for use in wing skins and other aerodynamic control surfaces and are detailed in patents such as EP 0056289-B1; U.S. Pat. Nos. 4,029,838; 4,500,589; and 5,227,216. None of these are directed at providing the impact improvements needed for typical metal composite building panels to meet the requirements for use in storm prone areas.

Accordingly, there is a need for an improved building panel for use in storm prone regions that offers improved impact resistance without increasing the weight of the panel or compromising the fire retardation properties of the wall system. There is a further need for a building panel having good adhesion between the outer metal skin and interior core components, and which is easy and inexpensive to manufacture.

SUMMARY OF THE INVENTION

The present invention provides a metal composite building panel having a fabric reinforcing sheet disposed between the outer metal skin and the polymer core.

The fabric reinforcing sheet is preferably an aramed fiber sheet, that preferably has a weight of about 5 oz./yd.$^2$ to about 20 oz./yd.$^2$. It preferably has a thickness of about 0.01 inch (0.254 mm) to about 0.03 inch (0.762 mm). Other high strength fibers, having a tenacity greater than 10 grams/denier, may be used as well, for example, high strength polyethylene, polyester or nylon fibers, or fiberglass.

The outer skin of the building panel is preferably a metal such as aluminum, aluminum alloy, stainless steel, galvanized steel, zinc, or titanium. 3XXX and 5XXX series aluminum alloys are particularly preferred. The metal skin preferably has a thickness of about 0.01 inch (0.254 mm) to about 0.03 inch (0.762 mm).

The polymer core preferably includes a polymer selected from the group consisting of polyethylene, polypropylene, or other polyolefin polymers and copolymers thereof. A preferred polymer core includes polyethylene, with the possible addition of fillers such as aluminum trihydrate, calcium carbonate, magnesium hydroxide, and/or others. The thickness of the polymer core may vary considerably, depending on the thickness and stiffness desired for the panel, but will typically be less than one inch (2.54 cm.).

The metal skins, polymer core, and fabric reinforcing sheet may be secured together using adhesives or "tie layers" that are sensitive to heat and/or pressure, such as the class of anhydride modified polyolefin adhesives sold under the trade names BYNEL® or PLEXAR®. Anhydride modified high density polyethylene adhesives are preferred, but multi-component polyolefin compositions such as those described in U.S. Pat. No. 6,855,432, which is expressly incorporated herein by reference, may be used as well, with adhesive components selected for their affinity to different adjacent panel materials. Other thermosetting or thermoplastic adhesive systems can be used as well, depending on the materials used for the polymer core and metal skins, for example, epoxies, polyurethanes, phenol resorcinals, vinyl acrylates, and other similar adhesives.

The panel is made by first laminating an adhesive layer to each side of the fabric reinforcing sheet. The fabric reinforcing sheet may then be processed as a single layer of fiber-reinforced adhesive, in the same manner as a simple adhesive layer would be processed. The combination of the adhesive coated fabric reinforcing sheet, exterior skin, and polymer core, along with an additional adhesive between the polymer core and opposing skin, are then stacked in the appropriate sequence and bonded together using heat and pressure. The resulting laminated structure may then be cut into individual panels.

It is therefore an object of the present invention to provide a building panel with a fabric reinforcing layer that is capable of resisting penetration of the panel in standard impact resistance tests in hurricane prone regions.

It is another object of the invention to provide a building panel that is light weight.

It a further object of the invention to provide a building panel system that reduces fuel content, and meets approval standards in regions wherein plywood-reinforced panels are no longer acceptable.

It is another object of the present invention to provide a building panel that may be manufactured with only minimal modification to the manufacturing equipment lines presently used for composite building panels.

These and other objects of the invention will become more apparent through the following description and drawings.

BRIEF DESCRIPTION OF THE DRAWINGS

Like reference characters denote like elements throughout the drawings.

DETAILED DESCRIPTION

The present invention provides a reinforced building panel providing improved impact resistance without adding substantial additional weight or adding fuel content as occurred with prior composite panels.

Figure 1:
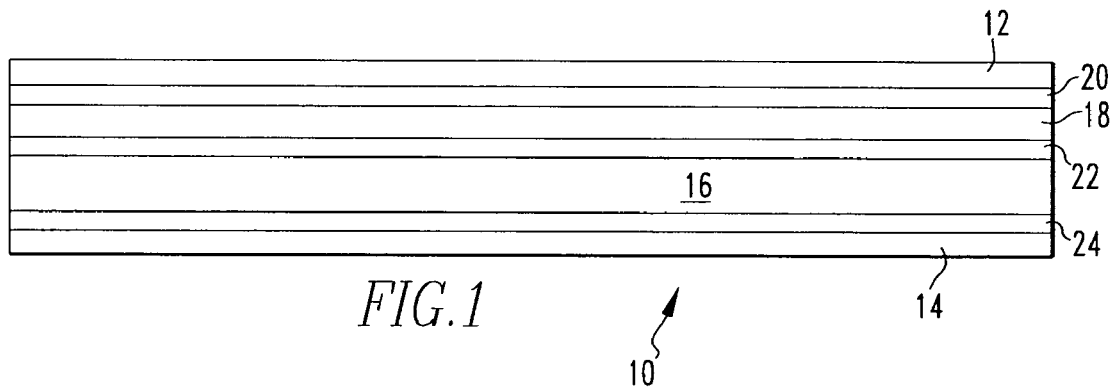
FIG. 1 is a cross sectional edge view of one embodiment of a building panel according to the present invention.

Referring to FIG. 1, one embodiment of a composite panel 10 is illustrated. The panel 10 includes an outer skin 12 and inner skin 14, with a core 16 disposed therebetween. A fabric reinforcement sheet 18 is disposed between the core 16 and outer skin 12. An adhesive layer 20 secures the outer skin 12 to the fabric reinforcing sheet 18. Likewise, an adhesive 22 secures the fabric reinforcing sheet 18 and core 16 together. Another adhesive 24 secures the core 16 to the inner skin 14.

The outer skin 12 and inner skin 14 are preferably made from a metal such as aluminum, aluminum alloys, stainless steel, galvanized steel, zinc, or titanium. Preferred metals include 3XXX and 5XXX series aluminum alloys, with 3105 aluminum alloy being particularly preferred. The outer skin 12 and inner skin 14 preferably have a thickness of about 0.01 inch (0.254 mm) to about 0.03 inch (0.762 mm), with a thickness of about 0.01 inch (0.254 mm) to about 0.02 inch (0.508 mm) being more preferred.

The core 16 is preferably made from a polymer having a density greater than 20 lb./ft.$^3$ (328.382 kg./m.$^3$). Preferred polymers include polyethylene and other polyolefins, with the possible addition of fillers such as aluminum tri-hydrate, calcium carbonate, magnesium hydroxide and/or others known to those skilled in the art of composite panels. The thickness of the polymer core may vary considerably, but will typically be less than about one inch (2.54 cm), and is preferably between about 1.5 mm. (0.059 inch) and about 5 mm. (0.199 inch).

The fabric reinforcing sheet 18 is preferably an aramid fiber sheet having a weight of about 5 oz./yd.$^2$ to about 20 oz./yd.$^2$. A more preferred aramid fiber sheet has a weight of about 7 oz./yd.$^2$ to about 14 oz./yd.$^2$. An example of a preferred aramid fiber is marketed under the trademark KEVLAR. Other high strength fibers, having a tenacity greater than 10 grams/denier, may be used as well, for example, high strength polyethylene, polyester or nylon fibers, or fiberglass.

The adhesive layers 20, 22, 24 may be a multi-component anhydride modified polyolefin adhesive, or anhydride modified high density polyethylene adhesive. Examples of preferred polyethylene adhesives are sold under the trademarks PLEXAR® and BYNEL®. The adhesive layers 20, 22, 24 preferably have a thickness between about 0.002 inch (0.051 mm) and 0.006 inch (0.152 mm).

Figure 2:
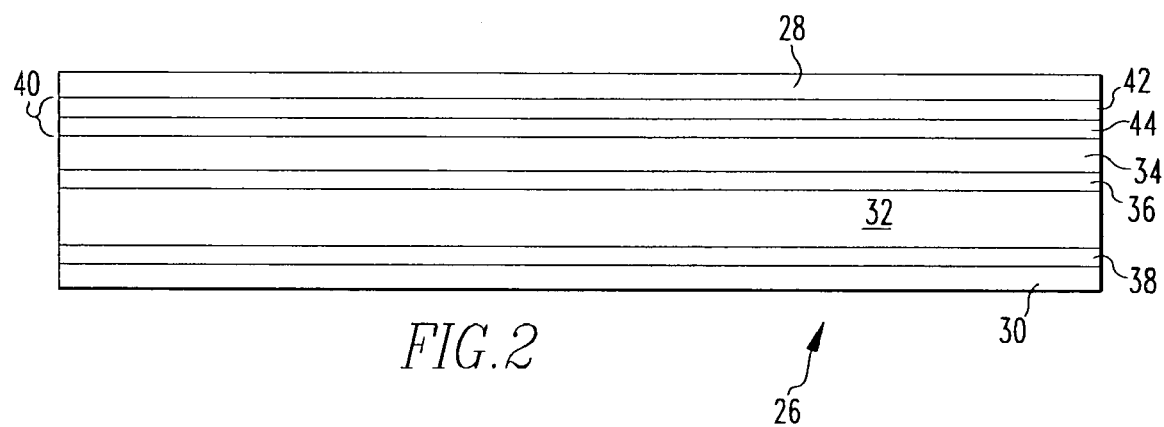
FIG. 2 is an edge cross sectional view of another embodiment of a building panel according to the present invention.

FIG. 2 illustrates another embodiment of a building panel 26. The panel 26 includes an outer skin 28 and inner skin 30. A core 32 is disposed between the outer skin 28 and inner skin 30. A fabric reinforcing sheet 34 is disposed between the core 32 and outer skin 28. An adhesive layer 36 secures the fabric reinforcing sheet 34 to a core 32. Likewise, an adhesive layer 38 secures the core 32 to the inner skin 30. The adhesive layer 40 between the fabric reinforcing sheet 34 and outer skin 28 includes two different adhesive layers bound together, with the first adhesive layer 42 being adjacent to the outer skin 28 and having an affinity for the outer skin 28, and the second layer 44 being adjacent to the fabric reinforcing sheet 34, and having an affinity for the fabric reinforcing sheet 34.

As before, the outer skin 28 and inner skin 30 are preferably made from a metal such as aluminum, aluminum alloys, stainless steel, galvanized steel, zinc, and titanium, with aluminum alloys being preferred. 3XXX and 5XXX series aluminum alloys are more preferred with 3105 aluminum alloy being particularly preferred. The outer skin 28 and inner skin 30 preferably have a thickness between about 0.01 inch (0.254 mm) and about 0.03 inch (0.762 mm), with a more preferred thickness being between about 0.01 inch (0.254 mm) to about 0.02 inch (0.051 mm).

The core 32 is preferably made from a polymer having a density greater than 20 lb./ft.$^3$ (328.382 kg./m.$^3$). Preferred polymers include polyethylene and other polyolefins, with the possible addition of fillers such as aluminum tri-hydrate, calcium carbonate, magnesium hydroxide and/or others known to those skilled in the art of composite panels. The thickness of the polymer core may vary considerably, but will typically be less than about one inch, and is preferably between about 1.5 mm (0.03 in.). and about 5 mm (0.059 in.).

The fabric reinforcing sheet 34 is preferably an aramid fiber sheet having a weight of about 5 oz./yd.$^2$ to about 20 oz./yd.$^2$. A more preferred aramid fiber sheet has a weight of about 7 oz./yd.$^2$ to about 14 oz./yd.$^2$. An example of a preferred aramid fiber is marketed under the trademark KEVLAR®. Other high strength fibers, having a tenacity greater than 10 grams/denier, may be used as well, for example, high strength polyethylene, polyester or nylon fibers, or fiberglass.

The adhesive layers 36, 38 may be either anhydride modified polyolefin adhesive or anhydride modified high density polyethylene adhesive. The adhesive layers 36, 38 preferably have a thickness of about 0.002 inch (0.051 mm.) to about 0.006 inch (0.152 mm.).

The adhesive layer 40 in this embodiment of the composite panel 26 includes two layers of adhesive 42, 44. Both layers 42, 44 are preferably anhydride modified polyolefin adhesives composed of anhydride modified polyethylene or ethylene vinyl acetate. Examples of preferred adhesives are presently marketed under the trademark BYNEL®. Anhydride modified polyethylene is particularly preferred for layer 42, for binding with the outer skin 28. Anhydride modified ethylene vinyl acetate is particularly preferred for the layer 44, for binding with the fabric reinforcing sheet 34.

The composite panels 10, 26 are made by first laminating the appropriate adhesive layers 20, 22 or 36, 40 to the fabric reinforcing sheet 18, 34. The combination of the fabric reinforcing sheet and adhesive layers is then stacked along with the outer skin 12, 28, inner skin 14, 30, core 16, 32, and adhesive 24, 38. The various layers of each panel 10, 26 are adhesively bound together by the application of heat and/or pressure.

Figure 3:
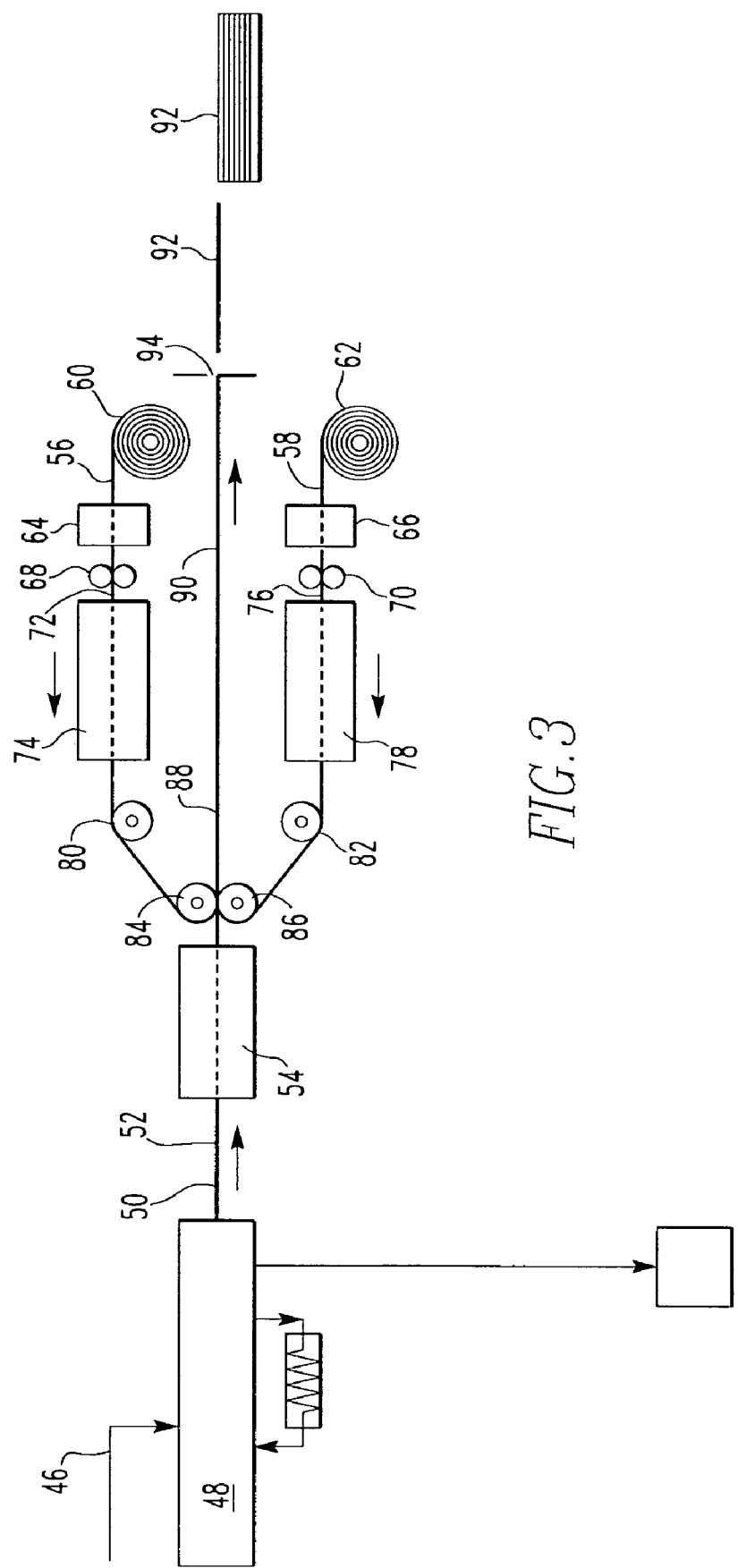
FIG. 3 is a schematic view of a manufacturing process for a composite panel of the present invention.

One example of a process by which a panel 10, 26 may be made is illustrated in FIG. 3. The appropriate polyolefin or polymeric resin pellets are introduced at 46 into the extruder 48, which extrudes a core layer 50 of the preselected thickness. After the core 50 undergoes air cooling at 52, it passes through a reheat oven 54.

Aluminum sheet 56 (for the outer skin 12, 28) and 58 (for the inner skin 14, 30) is supplied from the rolls 60, 62, respectively. The sheet 56, 58 is first passed through a preheat oven 64, 66, respectively. The roll 68 supplies a fabric reinforcing sheet 18, 34 having the adhesive layers 20, 22 or the adhesive layers 36, 40 already laminated thereto. The rolls 70 supplies an adhesive layer 24, 38. The combination 72 of the sheet 56 and reinforcing layer from the roll 68 pass through the oven 74. Likewise, the combination 76 of the sheet 58 plus the adhesive layer from the roll 70 pass through the oven 78. The metal/reinforcing layer combination 72 and metal/adhesive combination 76 may then be directed around the rollers 80, 82, respectively, and are then subsequently directed around the rollers 84, 86, respectively.

As the core layer 50, metal/reinforcing layer combination 72, and metal/adhesive layer combination 76 pass between the rollers 84, 86, the layers are pressed together into a single laminated structure 88 that is secured together by the various adhesive layers therein, which have been activated by heat and/or pressure. The laminated structure 88 is then air cooled at 90, and cut into individual panels 92 by a cutting device 94. The cutting device 94 may be a saw. The individual panels 92 may then be stacked and packaged for shipment.

Those skilled in the art of composite panels will recognize that the above disclosed procedure employs a similar manufacturing equipment line to that presently used for manufacturing prior art metal composite panels. A metal composite panel of the present invention is particularly advantageous because a laminated structure consisting of a fabric reinforcing sheet 18, 34, and the adhesive layers 20, 22, or 36, 40 may be processed exactly as a single adhesive layer, without any fabric reinforcement, may be processed. It has been found that a panel 10, 26 of the present invention will withstand the impact of a 15 lb. (6.803 kg.) 2 in.×4 in. (5.08 cm.×10.16 cm.) timber projectile traveling at 50 ft./sec. (15.24 m./sec.) without being penetrated by the timber.

A building panel 10, 26 of the present invention retains substantially the same fire resistant properties as a prior art building panel without a fabric reinforcing sheet 18, 34, unlike presently used plywood reinforced composite panels. The panel 10, 26 also remains relatively lightweight. The composite panels 10, 26 are easy to manufacture, requiring only minor modifications of presently used manufacturing procedures.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A building panel, comprising:
    an outer metal skin;
    an inner metal skin;
    a polymer core disposed between the outer metal skin and the inner metal skin;
    a fabric reinforcing sheet comprised of an aramid sheet disposed between a one of the metal skins and the polymer core; and
    an adhesive disposed between the aramid sheet and the one of the metal skins, the adhesive securing the aramid sheet to the one of the metal skins.

2. The building panel according to claim 1, wherein the fabric reinforcing sheet is made from a fiber having a strength of at least about 10 grams/denier.

3. The building panel according to claim 2, wherein the aramid fiber sheet has a weight of about 5 oz./yd.$^2$ to about 20 oz./yd.$^2$.

4. The building panel according to claim 2, wherein the aramid fiber sheet has a thickness of about 0.01 in. (0.254 mm.) to about 0.03 in. (0.762 mm.).

5. The building panel according to claim 1, wherein the adhesive is selected from the group consisting of a multi-layer anhydride modified polyolefin adhesive and an anhydride modified high density polyethylene adhesive.

6. The building panel according to claim 5, wherein the adhesive has a thickness of about 0.002 in. (0.051 mm.) to about 0.006 in. (0.152 mm.).

7. The building panel according to claim 1, wherein the metal skin is selected from the group consisting of aluminum, aluminum alloys, stainless steel, galvanized steel, zinc, and titanium.

8. The building panel according to claim 7, wherein the metal skin is an aluminum alloy selected from the group consisting of 3XXX and 5XXX series aluminum alloys.

9. The building panel according to claim 7, wherein the metal skin has a thickness of about 0.01 in. (0.254 mm.) to about 0.03 in. (0.762 mm.).

10. The building panel according to claim 1, wherein the polymer core includes polymers selected from the group consisting of polyethylene and ethylene vinyl acetate.

11. The building panel according to claim 10, wherein the polymer core includes polyethylene, aluminum trihydrate, and a fire retardant.

12. The building panel according to claim 1, wherein the polymer core has a thickness less than about 1 inch (2.54 cm.).

13. The building panel according to claim 12, wherein the polymer core has a thickness of about 1.5 mm. (0.059 in.) to about 5 mm. (0.199 in.)

14. The building panel according to claim 1, wherein the polymer core has a density exceeding 20 lb./ft.$^3$ (328.382 kg./m$^3$).

15. The building panel according to claim 1, wherein the adhesive includes two components, one of the two components having an affinity for the metal skin, and the other of the two components having an affinity for the aramid sheet or the polymer core.

* * * * *